UNITED STATES PATENT OFFICE.

JOHN H. LESTER, OF NEW YORK, N. Y.

IMPROVEMENT IN PRESERVING MILK AGAINST INJURY BY TRANSPORTATION.

Specification forming part of Letters Patent No. 170,003, dated November 16, 1875; application filed October 26, 1875.

*To all whom it may concern:*

Be it known that I, JOHN HENRY LESTER, of the city, county, and State of New York, have discovered a new and useful Improvement in the Method of Preserving Milk from Injury by Transportation; and I hereby declare that the following is a full, clear, and exact description thereof.

Heretofore it has been found impossible to transport milk for any considerable distance in warm weather for two reasons: the jolting of the vehicles of transportation keeps up such constant agitation that the milk is soon churned; contact with the atmosphere speedily sours it.

I obviate both these causes of destruction by so compressing the milk, by the aid of a force-pump or other means, within a strong and air-tight can, that the milk becomes so nearly a solid body as practically to prevent all movement. This, however, does not prevent the rising of the cream, which form is perfect in flavor, and not inferior to cream formed in the ordinary way, while the milk left after its removal is thought to be better than other milk which has traveled any distance, and in such manner that the milk and cream will be churned together. I have found from twenty to sixty pounds to the square inch pressure produces the desired result. However, I do not limit myself to just this, my main idea being to prevent the movement of the milk as much as possible within the vessel.

It is one of the advantages of my process that this natural action is not interfered with or disturbed, but goes on during transportation, just as if the milk were at rest in a dairy. If the temperature of the car in which it may be is as low as in a dairy, it will keep as long. By this process injury of the milk by electricity is also completely prevented.

I do not confine myself to the use of cans such as are now commonly used in the transportation of milk, but propose to use vessels of any kind so constructed as to admit of the desired amount of pressure, and afford the greatest convenience and economy.

What I claim, and desire to secure by Letters Patent, is—

The process herein described for preserving milk against injury by transportation or otherwise, which consists in forcing milk into an air-tight vessel, thereby presenting, as nearly as possible, a body immovable within the receptacle containing the same, substantially as specified.

JOHN HENRY LESTER.

Witnesses:
S. J. GORDON,
JOHN W. RIPLEY.